Figure 1:
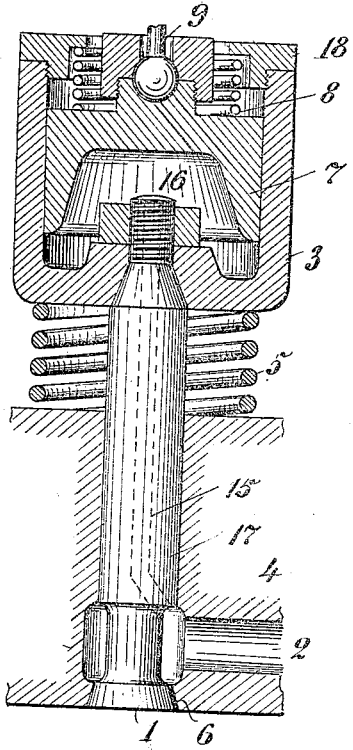

O. E. JÖRGENSEN.
COMPRESSED AIR STARTING DEVICE FOR MOTORS.
APPLICATION FILED MAY 18, 1912.

1,095,403.

Patented May 5, 1914.

Witnesses
H. E. Ford
James P. Barry

Inventor
Olav Eskil Jörgensen,
By
Attys

UNITED STATES PATENT OFFICE.

OLAV ESKIL JÖRGENSEN, OF COPENHAGEN, DENMARK.

COMPRESSED-AIR STARTING DEVICE FOR MOTORS.

1,095,403.   Specification of Letters Patent.   Patented May 5, 1914.

Application filed May 18, 1912. Serial No. 698,187.

*To all whom it may concern:*

Be it known that I, OLAV ESKIL JÖRGENSEN, chief engineer, a subject of the Kingdom of Denmark, residing at No. 9 Overgaden u. V. 9, in the city of Copenhagen, Denmark, have invented certain new and useful Improvements in Compressed-Air Starting Devices for Motors; and I do hereby declare the following to be a full, clear, and exact description of the invention, such as will enable others skilled in the art to which it appertains to make and use the same.

The invention has for its object a compressed air starting device for motors of any type.

Especially the invention refers to starting devices by which the valve controlling the supply of compressed air is controlled by a cam, through a suitable connecting-mechanism which by hand can be brought into or out of contact with said cam.

The purpose of the invention is to arrange said device in such a manner that said connecting-mechanism by means of the compressed air is automatically brought into or out of contact with said cam.

A constructional form of the invention is illustrated in the drawing, in which—

Figure 2:
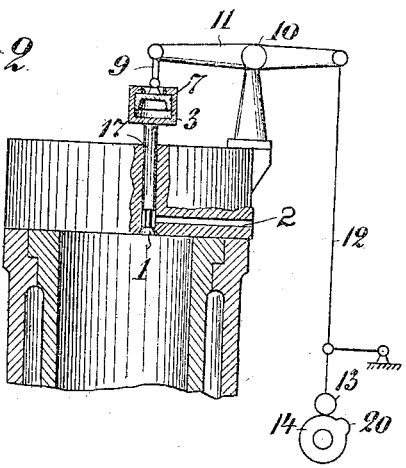

Figure 1 is a transverse-section of the valve, and Fig. 2 a sectional view of the complete arrangement.

1 is a starting valve and 2 the channel through which compressed air is supplied. This valve is controlled by mechanism including a composite bar. Thus to the upper end of the valve-spindle 17 is fixed a cylindrical cup 3 between which and the cover 4 of the motor cylinder a spring 5 is inserted, which normally presses the valve toward its seat so that said valve is closed. A piston 7 fits in the interior 16 of the cup 3, said piston can move up and down but it is normally held in its lowermost position by a spring 8. The piston 7 is connected by a link 9 with a lever 11 pivoted at 10, the other end of said lever being connected to a connecting-bar 12, which by means of a roller 13 can be brought into contact with a cam 14 and driven in timed relation to the crank shaft. The members 17, 3, 7 and 9 form a composite bar. The valve-spindle 17 is provided with a channel 15 connecting the compressed air channel 2 to the interior 16 of the cup 3.

Normally the piston 7 is held down by the spring 8 so that the end of the lever 11, to which the connecting bar 12 is attached, is raised, thereby holding the roller 13 in inoperative position, it is out of contact with the valve operating cam roller 14, 20. When the engine shall be started the main shaft of the engine is turned until the cam 20 of the cam roller 14 is directly beneath the roller 13. Then compressed air is supplied to the channel 2 from which a part will pass through the channel 15 into the space 16 below the piston 7, which latter consequently will be lifted against the action of the spring 8 until it bears against the ring-shaped stop 18, and it will be maintained in this lifted position as long as compressed air is supplied to the channel 2. When the piston 7 is lifted, the composite valve stem 17, 3, 9 is lengthened, causing the lever 11 to be rocked, thereby pressing the roller 13 against the cam 20 so that the valve 1 is opened and compressed air enters the engine cylinder and moves the engine piston. Of course the main shaft of the engine is rotated and the valve operating cam 14, 20 will consequently now operate the starting valve 1 in the ordinary manner, as long as compressed air is supplied to the channel 2 and causes the piston 7 to maintain its uppermost position. The operating surface of the piston 7 has such an area, that a very little pressure of compressed air will be sufficient to maintain the piston in its position against the stop 18, so that said piston together with the cup 3 will be pressed down, overcoming the spring 5 and thereby open the valve 1, when the cam projection 20 lifts the connecting bar 12 and presses down link 9. When the compressed air is exhausted from the channel 2 the spring 5 will lift the cup 3 and the spindle 17 thereby closing the valve 1. Simultaneously the spring 8 returns the piston 7 to the position shown in Fig. 1.

As previously stated, the device illustrated and described is only a constructional form of the invention and the latter is characterized by the fact that the controlling mechanism of the starting valve is automatically put into operation when compressed air is supplied to the channel 2, and that said controlling mechanism is again automatically made inoperative when the supply of compressed air to the channel 2 ceases.

Claims.

1. In a starting device for engines, the combination with the cylinder, of a conduit for compressed gas leading to said cylinder, a valve controlling communication between said conduit and the cylinder, an actuating lever for the valve, means for operating said actuating lever normally in inoperative relation thereto and means interposed between said lever and said valve for effecting an operative relation between the lever and said actuating means upon admission of compressed gas to said conduit.

2. In a starting device for engines, the combination with the cylinder of a conduit for compressed gas leading to said cylinder, a valve controlling communication between said conduit and the cylinder, a valve actuating lever, means for driving said lever normally in inoperative relation thereto, and a connection between said lever and the valve adapted upon admission of compressed air to said conduit to move said lever into a position to be operated by said driving means and designed upon the cutting off of the admission of compressed gas to said conduit to automatically move the lever to an inoperative position.

3. In a starting device for engines, the combination with the cylinder, of a conduit for compressed gas leading to said cylinder, a valve controlling communication between said conduit and the cylinder, means for controlling the valve and means intermediate said controlling means and the valve adapted to connect the controlling means and the valve when compressed gas is supplied to said conduit and to automatically disconnect the controlling means and the valve when the supply of compressed gas to said conduit is cut off.

4. In a starting device for engines, the combination with the cylinder, of a conduit for compressed gas leading to said cylinder, a valve controlling communication between said conduit and the cylinder, means for controlling the valve including a composite bar, and means for automatically lengthening and shortening said composite bar respectively when compressed gas is supplied to and cut off from said compressed gas conduit.

5. In a starting device for engines, the combination with a cylinder, of a conduit for compressed gas leading to said cylinder, a valve controlling communication between the conduit and the cylinder, a composite bar controlling said valve including a piston and cylinder, a spring acting normally to move the piston inward, means for actuating said bar, and a by-pass leading from said conduit to said cylinder below the piston whereby upon admission of compressed gas to said cylinder the piston is automatically moved outward and upon the cutting off of the supply of compressed gas to said conduit the piston is automatically moved inward.

6. In a starting device for engines, the combination with the cylinder, of a conduit for compressed air leading to said cylinder, a valve controlling the communication between said conduit and the cylinder, an actuating lever for said valve, means for operating said actuating lever normally in inoperative relation thereto, and means associated with said lever for effecting an operative relation between the lever and said actuating means, including a piston and cylinder, and means acting to normally hold the last mentioned piston inward, there being a compressed air connection to said last mentioned cylinder.

In testimony whereof, I affix my signature, in presence of two witnesses.

OLAV ESKIL JÖRGENSEN.

Witnesses:
MARCUS MOÉLER,
C. E. CURTIS.